United States Patent [19]

Gomes

[11] Patent Number: 5,687,932
[45] Date of Patent: Nov. 18, 1997

[54] APPARATUS FOR REMOVING HEAT

[75] Inventor: Jose Gomes, Hamburg, Germany

[73] Assignee: Daimler-Benz Aerospace AG, Munich, Germany

[21] Appl. No.: 409,840

[22] Filed: Mar. 27, 1995

[30] Foreign Application Priority Data

Mar. 29, 1994 [DE] Germany .................. 44 10 914.8

[51] Int. Cl.[6] ........................................... B64G 1/50
[52] U.S. Cl. .............................. 244/163; 165/104.12
[58] Field of Search ........................ 244/117 A, 163, 244/150 R; 165/104.12, 41; 62/46.2, 249, 4; 60/39.12, 39.54, 39.51

[56] References Cited

U.S. PATENT DOCUMENTS

| | | | |
|---|---|---|---|
| 3,929,305 | 12/1975 | Sabol | 244/117 A |
| 4,345,729 | 8/1982 | Barter | 60/39.12 |
| 4,457,136 | 7/1984 | Nishizaki et al. | 165/104.12 |
| 4,513,810 | 4/1985 | Poorman | 244/163 |
| 4,609,038 | 9/1986 | Ishikawa et al. | 165/104.12 |
| 4,687,049 | 8/1987 | Golben | 165/104.12 |
| 4,701,199 | 10/1987 | Kabe et al. | 165/104.12 |
| 4,819,718 | 4/1989 | Ishikawa et al. | 165/104.12 |
| 5,177,952 | 1/1993 | Stone | 165/39.12 |
| 5,232,672 | 8/1993 | Spadaccini et al. | 60/39.12 |
| 5,257,755 | 11/1993 | Moser et al. | 62/4 |
| 5,279,484 | 1/1994 | Zimmermann | 244/172 |
| 5,291,735 | 3/1994 | Kester | 60/39.12 |
| 5,456,093 | 10/1995 | Dunne et al. | 165/104.12 |
| 5,469,913 | 11/1995 | Gamon | 165/104.12 |

FOREIGN PATENT DOCUMENTS 0133066  6/1988  European Pat. Off. .

Primary Examiner—Galen L. Barefoot
Attorney, Agent, or Firm—W. G. Fasse; W. F. Fasse

[57] ABSTRACT

An apparatus for removing heat from a thermally highly loaded structure, such as a spacecraft or hypersonic aircraft, is based on an endothermic reaction, and particularly the water gas synthesis reaction. A system of pipes (2) is arranged in the areas of the structure that are to be cooled. The pipes (2) are filled with a carbon core that includes passages through which steam passes, to react with the carbon and generate water gas. The system preferably includes a steam generator that uses some of the heat from the areas to be cooled for generating the steam that is conveyed through the carbon filled pipes (2).

18 Claims, 2 Drawing Sheets

APPARATUS FOR REMOVING HEAT

FIELD OF THE INVENTION

The invention relates to an apparatus for removing and rejecting thermal energy in a structure that is highly thermally loaded, for example a spacecraft, wherein the incipient heat is used and converted in an endothermic chemical reaction.

BACKGROUND INFORMATION

When a spacecraft re-enters the earth's atmosphere, and when an extremely fast aircraft, such as a so-called hypersonic aircraft, flies through the atmosphere, portions of the outer hull of the flying body are subjected to high heat loading. For example, especially the leading edges of the wings and the nose of a hypersonic aircraft are subject to very high thermal loading. One known solution to this problem involves using so-called ablation materials, which distribute over a larger area the great amount of thermal energy arising at the critical locations, and which may also vaporize or otherwise deteriorate due to the heating, whereby a temperature reduction is achieved. Other possible solutions include the use of a heat shield consisting of temperature resistant tiles, or of locally applied cooling using liquid hydrogen, which is also used for the propulsion of the spacecraft.

A disadvantage of using an ablative material is that a rather thick layer of the material must be applied in order to reliably protect the inside of the spacecraft from an unacceptably high penetration of heat. Furthermore, the aerodynamic outer surface of the ablative material changes as it vaporizes, so that it deviates from the precalculated optimum aerodynamic shape and results in an altered aerodynamic characteristic. A disadvantage of using tiles to form a heat shield, as is done in the Space Shuttle for example, is that a relatively thick layer of the tiles is necessary and thereby a substantial additional weight must be transported by the spacecraft. A disadvantage of directly cooling the flying body's structure with liquid hydrogen is that it must be carried out at a very low temperature, because the liquid hydrogen is provided in a cryogenic state. As a result, reducing the temperature of the structure necessarily increases the reception of heat energy, whereby in turn the required amount of cooling medium increases. Moreover, this method of cooling requires a very good thermal insulation of the outer skin of the flying body, because the temperature of the pipes through which the hydrogen cooling medium flows cannot be allowed to become too high.

European Patent 0,133,066 discloses an apparatus that uses an endothermic chemical reaction to remove the incident heat. The reference discloses a composite assembly including several layered plates that form a heat protective shield or a heat dissipation screen for relatively low temperatures in the range up to approximately 100° C. The known apparatus includes a heated plate and a cold plate, between which a reactive substance is enclosed, whereby the reactive substance releases a nonflammable gas or steam upon reaching a certain temperature. Water may be provided as the reactive substance, and the outer plate of the shield is made of a material that will undergo an endothermic reaction with the gas or the superheated steam. Among several other materials, carbon may be used as the outer plate material.

OBJECTS OF THE INVENTION

In view of the above it is the aim of the invention to achieve the following objects singly or in combination:

to provide an apparatus for removing thermal energy, which achieves the largest possible heat sink at a relatively high temperature level;

to provide such an apparatus that achieves cooling at a nearly constant temperature;

to provide such an apparatus that can achieve cooling directly at the critical areas or highly heated areas;

to provide such an apparatus in a flying body such as an aircraft or spacecraft, whereby the aerodynamic outer shape of the flying body is not affected;

to provide such an apparatus that has a low total weight compared to prior art heat shielding or heat rejecting apparatus; and to provide a system for selectively utilizing the energy that is received as thermal energy, for increasing the propulsion of the flying body or for powering auxiliary on-board equipment.

SUMMARY OF THE INVENTION

The above objects have been achieved in an apparatus for removing heat according to the invention, wherein the incident heat is converted or absorbed in an endothermic chemical reaction. To achieve this, pipes or tubes are arranged in the areas of a structure, such as an aircraft or spacecraft, which are subjected to heating. The pipes contain a reducing agent having passages therethrough, wherein these passages are adapted to have water steam flow therethrough.

More particularly, a steam generator can be provided upstream of the system of pipes that contain the reducing agent. Preferably, the reducing agent comprises carbon and the endothermic chemical reaction is a water gas synthesis reaction in which water and carbon react while absorbing thermal energy to form hydrogen and carbon monoxide gas. Alternatively, the reducing agent can be a metal or a metal oxide that reacts with water to reduce the water. The reaction products can be used as a propellant or can undergo an exothermic reaction to reject heat and again prepare the starting materials.

An advantage of the inventive apparatus is that the cooling effect is carried out at a nearly constant temperature at a relatively high temperature level. Therefore, the cooling does not increase the incident heat flux into the structure to be cooled. The cooling effect can take place directly at the thermal boundary of the material, whereby the heat flux from the outside into the structure can be substantially reduced.

The above mentioned water gas synthesis reaction is particularly suited for use in conjunction with the apparatus according to the invention. This reaction is well known per se, as it is one of the oldest methods for producing hydrogen ($H_2$). Most commonly, this reaction is carried out in a blast furnace, wherein the thermal energy required for reducing the water is provided by partially combusting the coal or coke that is used as a carbon source. The reaction is based on the reduction of water by using carbon according to the reaction equation:

$$H_2O + C + 118.7 MJ \rightarrow CO + H_2 \qquad \text{Equation (1)}$$

The indicated thermal energy quantity of 118.7 Mega-Joules (MJ) relates to 1 kmol (i.e. 18.015 kg) of water and 1 kmol (i.e. 12.01 kg) of carbon. In the reaction, 1 kmol (i.e. 22.414 $m^3$ or 2.016 kg) of molecular hydrogen is produced.

By realizing this endothermic chemical reaction in the present cooling apparatus, the invention achieves the advantage that the absorbed heat does not need to be given off again, because both the initial starting materials or reactants as well as the end products of this process are stable, or at least metastable. The end product is a flammable gas that can be used as a gaseous fuel in one embodiment of the present apparatus, for example as a propellant in a hypersonic aircraft. In this manner, the total amount of propellant fuel that must be carried on-board the aircraft can be reduced because the on-board cooling medium, in this case water, provides a portion of the required propellant.

Instead of using the reaction end product as a fuel, it is alternatively possible to cool the reaction product using a secondary cooling medium, for example cryogenic hydrogen, which is typically used as a propellant in the main propulsion plant of a hypersonic aircraft. By using an appropriate cooling rate and possibly using a catalyst, it is possible to carry out a chemical conversion of the reaction products of the primary cooling megdium. Thereby two advantages are achieved. First, the chemical conversion is an exothermic process, so that cooling the reaction product using cryogenic hydrogen establishes a regenerative cooling loop or cooling circuit, and results in a considerable saving of propellant. Secondly, because the primary cooling medium is constantly and repetitively regenerated, through the cooling and chemical conversion, a completely closed cooling circuit results. In this manner, the specific heat capacity of the cooling medium is theoretically infinite, because the cooling medium is continuously regenerated. Thus, the heat capacity is only limited by the heat sink effect provided by the quantity of propellant being used.

By using a combination of water and carbon, the highest possible specific heat absorption capacity relative to the mass can be achieved. Furthermore, the high heat capacity and high vaporization enthalpy of the water can additionally be used advantageously for the cooling purpose. Another advantage is that the on-board consumable water and/or the water formed by the combustion in the fuel cells can be used in the cooling circuit. This water is provided anyway in spacecraft, such as the space shuttle for example, so that reusing this water for cooling saves weight and allows the useful payload weight to be increased. Furthermore, the present cooling apparatus has a much lower total mass than the otherwise necessary heat shield, which further increases the usable payload. Finally, the cooling apparatus according to the invention is also especially well suited for use in re-entry capsules.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
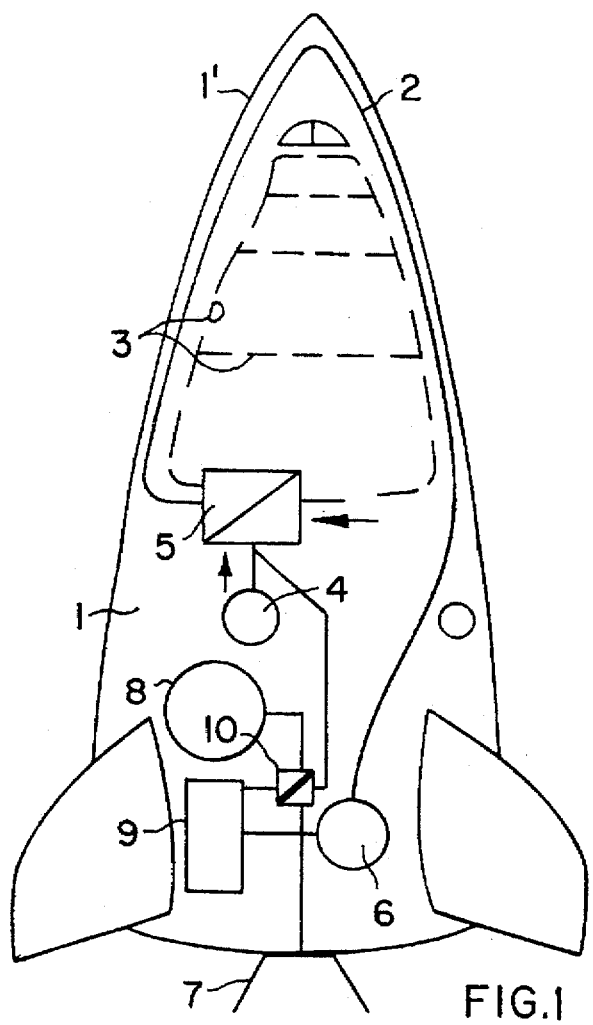
FIG. 1 is a principal schematic view of a hypersonic aircraft including the cooling apparatus according to the invention.

FIG. 1 shows a flying body 1, for example a hypersonic aircraft, in which a cooling system according to the present invention is installed. The present cooling system operates on the principal of the water gas synthesis reaction, and includes a first system of pipes 2 (shown by solid lines) and a second system of pipes 3 (shown by dashed lines) installed especially at the heat impacted areas of the aircraft 1, for example at the leading edges and the nose 1' of the aircraft 1. The pipes 2 form a steam and water gas flow circuit, while the pipes 3 form a water flow circuit. The details of these two circuits will be described below with reference to FIG. 5.

Figure 2:
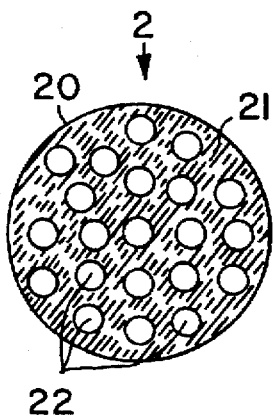
FIG. 2 is a cross-section of a first embodiment of a pipe used in the present cooling system.
Figure 3:
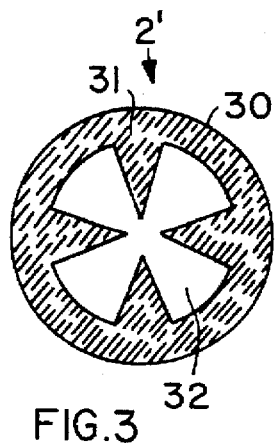
FIG. 3 is a cross-section of a second embodiment of a pipe used in the present cooling system.
Figure 4:
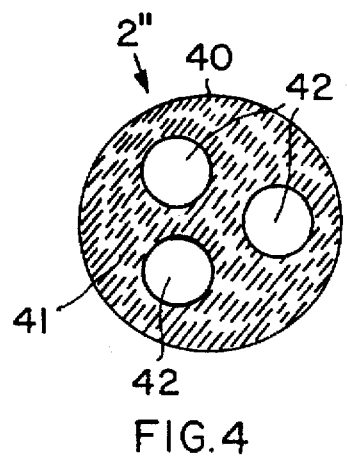
FIG. 4 is a cross-section of a third embodiment of a pipe used in the present cooling system.

FIGS. 2 to 4 show the internal structure of various possible embodiments of the pipes of the pipe system 2. In the three embodiments shown, the pipe wall 20, 30, 40 consists essentially of a high temperature resistant material, for example a nickel based alloy, molybdenum, tungsten, or titanium zirconium stabilized molybdenum (TZM). The preferred material is TZM, because it has good thermal conductivity and can be easily machined. The interior of each pipe contains a core or filler 21, 31, 41 consisting essentially of carbon pressed into the pipe. Alternatively, the filler 21, 31, 41 may comprise a metal or metal oxide;

Each core or filler 21, 31, 41 includes holes or passages 22, 32, 42 that serve as a throughflow passage for gas. The passages may comprise a plurality of cylindrical holes, or a single passage having a convoluted wall surface with a high ratio of surface area relative to flow cross-section and more particularly having a cross-sectional shape in a plane perpendicular to a lengthwise axis of the pipe that has a convoluted perimeter and substantial rotational symmetry about the lengthwise axis as shown in FIG. 3. Another possible embodiment of the core or filler, which is not shown, is to fill each pipe 2 with carbon spheres or particles, whereby the interstitial spaces between the spheres form the gas throughflow passages.

Figure 5:
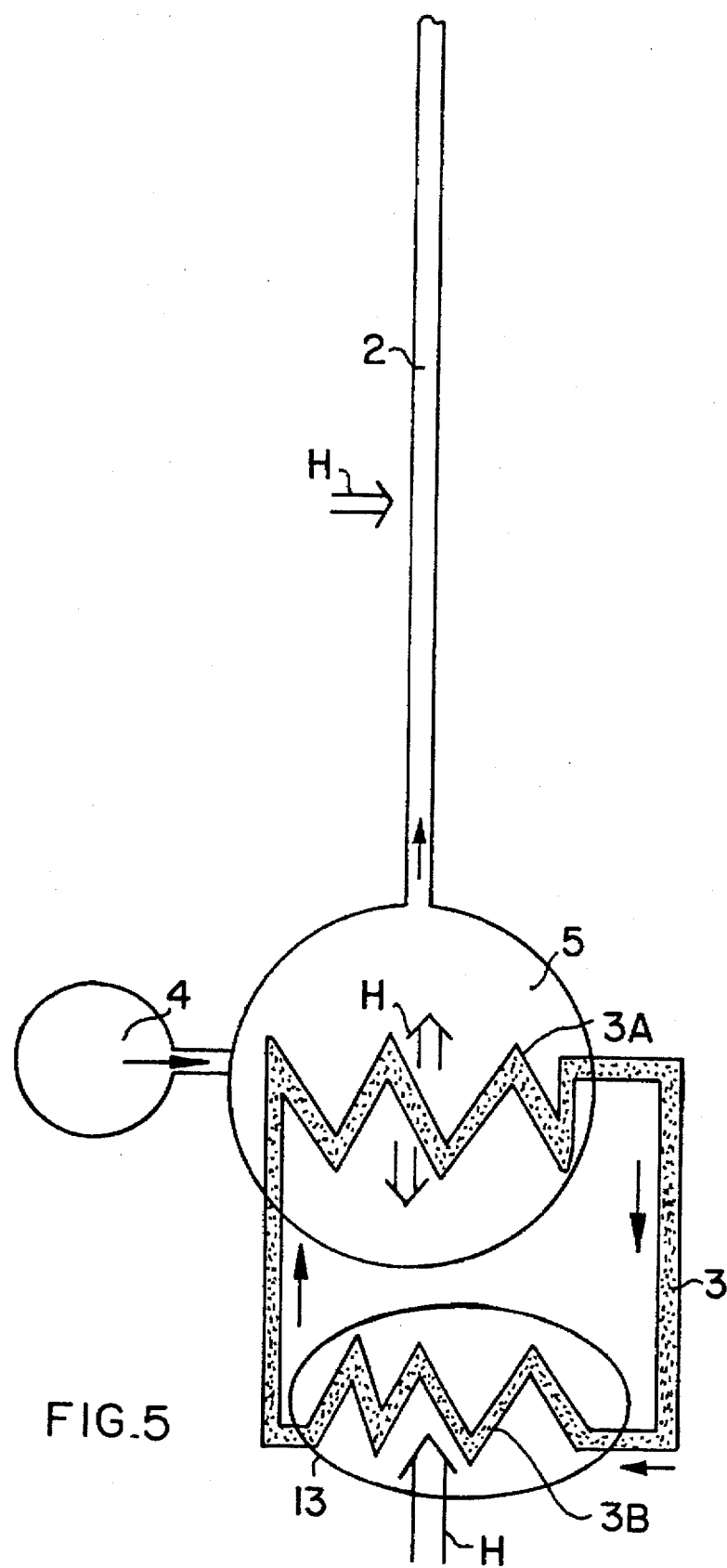
FIG. 5 is a detailed schematic view of a portion of the cooling system shown in FIG. 1.

Referring further to FIG. 1 and the more detailed view of FIG. 5, the water required for the cooling process is carried in a water tank 4. From there, the water is conveyed to a steam generator 5. Arranged within the tank of the steam generator 5 is a heat exchanger pipe 3A connected to the pipe 3 of the cooling water circuit. Thus, the steam generator 5 is an interface between the steam and water gas circuit and a separate cooling water circuit. The cooling water circuit further comprises a heat exchanger pipe 3B located at a hot area of the aircraft 1' or at an on-board heat producer 13 such as on-board electronic devices having a high heat dissipation and/or at the cockpit area of the aircraft.

The heat transfer into and out of the cooling circuit comprising the cooling circuit pipe 3 is shown by arrows H. The cooling capacity is provided by the isobaric heat capacity as well as the vaporization enthalpy of the water. That is to say, the water circulating through the pipe system 3 is at least partially or totally converted to steam in the heat exchange pipe 3B as it cools the heat producers 13. The steam is circulated to the heat exchange pipe 3A where it cools and condenses, while the water flowing into the steam generator 5 from the tank 4 is correspondingly heated and converted to steam.

As steam is produced in the steam generator 5, a pressure develops and drives the steam through the gas passages 22, 32, 42 of the pipes 2. The pipes 2 are heated somewhat by the steam and are further heated by the heat (arrow H) from the hot skin 1' of the aircraft 1. Once the temperature of the interior of the pipes 2 exceeds about 1000° C., a water gas synthesis reaction of the steam and the carbon will begin according to the reaction equation:

$$H_2O+C+118.7MJ \rightarrow CO+H_2. \qquad \text{Equation (2)}$$

This endothermic reaction uses up heat and thereby prevents the temperature inside the pipes from exceeding approximately 1100° C. The cross-sectional dimensions and shape of the gas passages 22, 32 or 42 are selected so that the flow velocity and residence time of the steam in the pipes 2 is sufficient for achieving as complete a conversion of the steam as possible. If necessary, this can also be achieved by recirculating the steam.

The water gas formed in the cooling process is a mixture of hydrogen gas and carbon monoxide, present at a temperature of about 1100° C. and having a high combustion fuel energy value. Referring again to FIG. 1, the water gas can be accumulated and at least temporarily stored in a reservoir vessel 6 connected to outlet end of the pipe 2. The water gas can then be used as a fuel for the main propulsion plant of the aircraft 1 and/or for an on-board auxiliary power generator, for example. An optimal use of the water gas is achieved by injecting it into the expansion or after-burn nozzle 7 of the main propulsion unit of the aircraft 1. In this manner, the water gas increases the thrust in the secondary expansion, without requiring any special auxiliary apparatus or special adjustments of the main engine.

Insofar as the produced water gas is not to be combusted as a propellant, it can be cooled by the liquid hydrogen that is carried on-board as fuel for the main propulsion plant. For this purpose, it is advantageous if the initially 1100° C. water gas is first precooled to about 900° C., at which the water gas is considerably easier to handle. The precooling can be achieved by directing the water gas along areas of the aircraft skin that are not highly heated, for example in a precooling arrangement such as a radiator panel 9, whereby the water gas radiates away some of its heat energy. Below about 900° C., the carbon monoxide contained in the water gas decomposes into carbon and carbon dioxide while giving off heat, according to the Boudouard equilibrium equation. If desired, this process can be accelerated through the use of an appropriate catalyst as is generally known. This chemical decomposition occurs according to the reaction:

$$CO+CO \rightarrow C+CO_2+160MJ \qquad \text{Equation (3)}$$

whereby approximately 160 MJ of energy are released for an input of about 2 kmol (i.e. 28 kg), which corresponds to a specific energy of approximately 5.7 MJ/kg of carbon monoxide.

The energy being released during the above described exothermic reaction can be used to preheat the hydrogen propellant for the main propulsion plant, so as to increase the total propulsion power without increasing the total amount of required fuel. This is achieved because of the energy transfer from the decomposing water gas to the hydrogen fuel, whereby the required combustion chamber temperatures are reached with a smaller amount of fuel because the fuel has been preheated. FIG. 1 shows schematically that the decomposition of the water gas can occur upstream of or within a heat exchanger 10 which comprises an exothermic reaction vessel. Thus, the heat released by the decomposition reaction is transferred to the hydrogen fuel flowing from a fuel tank 8 through a conduit to the heat exchanger 10, and from there through a conduit to the main propulsion unit 7.

The carbon and carbon dioxide resulting from the decomposition of the water gas can then be reintroduced or reused in the cooling process for the high temperature areas. The carbon produced in the decomposition reaction is a fine powder or dust of carbon that is turbulently mixed and suspended in the carbon dioxide and hydrogen gas mixture. A conduit conveys the carbon, carbon dioxide and hydrogen mixture from the heat exchanger 10 back to the steam generator 5 or directly to the pipes 2. When the gas and carbon mixture is returned into the pipes 2 filled with carbon 21, 31, 41, the carbon dioxide and the carbon suspended in the gas, as well as the carbon present in the pipe 2 will be converted to carbon monoxide according to reaction equation:

$$C+CO_2+160MJ \rightarrow CO+CO \qquad \text{Equation (4)}$$

whereby the energy quantity again relates to 1 kmol of C and $CO_2$. This reaction process can be multiply repeated as required.

The embodiment of FIG. 4, using a steam generator 5 for providing the required flow for driving the steam through the pipes 2, is especially advantageous for use in a re-entry capsule that does not include its own propulsion system. In such a case, the energy necessary for vaporizing the water is provided completely by cooling on-board devices having a high heat dissipation and by cooling the frictionally heated areas of the capsule skin. The pressure arising in the steam generator 5 provides the entire driving force necessary for transporting the steam through the cooling system. Thus, when the heating effect on the capsule increases during re-entry into the atmosphere, this leads to an increased steam generation and steam flow rate. In turn, this results in an increased rate of water gas synthesis in the pipes 2 and a corresponding increased cooling effect. Thus, the steam flow rate and therewith the instantaneous cooling rate is substantially self-regulating.

Although the invention has been described with reference to specific example embodiments, it will be appreciated that it is intended to cover all modifications and equivalents within the scope of the appended claims.

What is claimed is:

1. An apparatus for removing heat from a thermally loaded structure having a heated portion, said apparatus comprising a pipe that is arranged at said heated portion and that has a water steam, inlet into an interior of said pipe, a water steam generator connected to said water steam inlet of said pipe, and a reducing agent provided in said interior of said pipe such that said reducing agent will be in direct contact with water steam-introduced into said interior of said pipe from said steam generator, and such that an endothermic chemical reaction will take place between said water steam and said reducing agent using said heat removed from said thermally loaded structure.

2. The apparatus of claim 1, wherein said structure is a flying body, and said heated portion comprises a portion of an outer skin of said flying body that is subjected to frictional heating.

3. The apparatus of claim 1, wherein said steam generator comprises a steam generator vessel that is connected for steam flow to said water steam inlet of said pipe, and a heat transfer loop, and wherein said heat transfer loop comprises a heat emitting heat exchanger arranged in said steam generator vessel, a heat receiving heat exchanger, conduits connecting said heat emitting heat exchanger and said heat receiving heat exchanger, and a heat transfer medium contained in said heat exchangers and said conduits.

4. The apparatus of claim 3, wherein said heat receiving heat exchanger is arranged at said heated portion.

5. The apparatus of claim 1, wherein said reducing agent is in the form of a filler core packed into said interior of said pipe, wherein said filler core has a plurality of substantially cylindrical open passages passing therethrough in a direction parallel to a lengthwise axis of said pipe.

6. The apparatus of claim 1, wherein said reducing agent is in the form of a filler core packed into said interior of said pipe, wherein said filler core has a single open passage passing therethrough in a direction parallel to a lengthwise axis of said pipe, and wherein said open passage has a cross-sectional shape in a plane perpendicular to said lengthwise axis that has a convoluted perimeter and substantial rotational symmetry about said lengthwise axis.

7. The apparatus of claim 1, wherein said pipe consists essentially of a material selected from the group consisting of nickel-based alloys, molybdenum, tungsten and titanium-zirconium stabilized molybdenum.

8. The apparatus of claim 7, wherein said material of said pipe is titanium-zirconium stabilized molybdenum.

9. The apparatus of claim 1, wherein said reducing agent consists essentially of carbon (C) and said endothermic chemical reaction is a water gas synthesis reaction in which said carbon (C) reduces water steam ($H_2O$) introduced into said interior of said pipe from said steam generator to hydrogen ($H_2$) while forming carbon monoxide (CO) according to the reaction equation: $H_2O + C + Energy \rightarrow CO + H_2$, and wherein said pipe further includes a water gas outlet.

10. The apparatus of claim 1, wherein said reducing agent consists essentially of at least one material selected from the group consisting of metals and metal oxides, and wherein said chemical reaction comprises a reduction of water steam introduced into said interior of said pipe from said steam generator using said reducing agent.

11. The apparatus of claim 1, wherein said structure is a powered spacecraft having a propulsion plant, and wherein an outlet of said pipe is connected at least indirectly to said propulsion plant so that reaction products of said chemical reaction are conveyed to and combusted in said propulsion plant.

12. The apparatus of claim 11, further comprising a storage tank for said reaction products interposed between said outlet of said pipe and said propulsion plant.

13. The apparatus of claim 1, further comprising an exothermic reaction vessel interposed and connected between an outlet of said pipe and said water steam inlet of said pipe, wherein said exothermic reaction vessel is adapted to have an exothermic chemical decomposition reaction of a reaction product of said endothermic chemical reaction take place therein.

14. The apparatus of claim 13, further comprising a heat rejecting member interposed between said outlet of said pipe and said exothermic reaction vessel.

15. The apparatus of claim 13, wherein said structure is a powered spacecraft having a fuel tank containing fuel and a propulsion plant connected by a fuel conduit to said fuel tank, and wherein said exothermic reaction vessel comprises a heat exchanger interposed in said fuel conduit between said fuel tank and said propulsion plant, wherein heat released by said exothermic chemical reaction is conveyed to said fuel.

16. In a flying body having a fuselage skin surface subject to aerodynamic frictional heating as said flying body passes through earth's atmosphere, an improved cooling system comprising first means for generating water steam, second means connected to said first means for conveying water steam from said first means and for heating said water steam with heat from said fuselage skin surface, and reducing agent means cooperating with said second means for reducing said heated water steam in an endothermic chemical reduction reaction.

17. The improved cooling system in the flying body of claim 16, wherein said first means comprises a steam generator vessel and a heat transfer loop interconnecting said fuselage skin surface and said steam generator vessel for heat transfer from said fuselage skin surface to said steam generator vessel.

18. The improved cooling system in the flying body of claim 16, wherein the flying body includes a propulsion plant, wherein the reducing agent means is arranged within the second means, and wherein the second means includes a reaction product outlet connected to said propulsion plant such that a reaction product of said endothermic chemical reduction reaction is conveyed to and combusted in said propulsion plant.

* * * * *

UNITED STATES PATENT AND TRADEMARK OFFICE
CERTIFICATE OF CORRECTION

PATENT NO. : 5,687,932

DATED : Nov. 18, 1997

INVENTOR(S) : Gomes

It is certified that error appears in the above-identified patent and that said Letters Patent is hereby corrected as shown below:

On the Title Page: in [56], line 15, "Kester" should be --Kesten--.

Col. 6, line 35, replace "water steam, inlet" by --water steam inlet opening--.

Col. 6, line 39, replace "steam-introduced" by --steam introduced--.

Signed and Sealed this

Third Day of February, 1998

BRUCE LEHMAN

Attest:

Attesting Officer

Commissioner of Patents and Trademarks